United States Patent [19]

Takasu

[11] 4,235,129
[45] Nov. 25, 1980

[54] SPEED REDUCTION MECHANISM

[76] Inventor: Isamu Takasu, 11 of 35, Nishiogi-Kita 3-chome, Suginami-ku, Tokyo, 165, Japan

[21] Appl. No.: 891,759

[22] Filed: Mar. 30, 1978

[51] Int. Cl.³ .............................................. F16H 1/28
[52] U.S. Cl. ...................................................... 74/805
[58] Field of Search .......................... 74/805, 804, 784

[56] References Cited

U.S. PATENT DOCUMENTS

| | | | |
|---|---|---|---|
| 2,026,880 | 1/1936 | Fliesberg et al. | 74/805 |
| 2,748,616 | 6/1956 | Foster et al. | 74/805 |
| 2,795,155 | 6/1957 | Bade | 74/805 |
| 3,013,447 | 12/1961 | Hils et al. | 74/805 |
| 3,052,138 | 9/1962 | Louton, Jr. et al. | 74/805 |
| 3,424,036 | 1/1969 | Colgan | 74/805 |
| 3,662,623 | 5/1972 | Lorence | 74/805 |
| 4,016,780 | 4/1977 | Baranyi | 74/805 |
| 4,023,440 | 5/1977 | Kennington et al. | 74/805 |
| 4,063,710 | 12/1977 | Minami et al. | 74/805 |

*Primary Examiner*—Allan D. Herrmann
*Attorney, Agent, or Firm*—Robert E. Burns; Emmanuel J. Lobato; Bruce L. Adams

[57] ABSTRACT

A first drive element of a speed changer is rotatably supported in front of and coaxial with a stationary support, and a second drive element is rotatably supported by and coaxial with the stationary support. An intermediate disc is eccentrically mounted on the first drive element for transmitting rotary motion between the first and second drive elements; guiding and locking devices are connected with the support for locking the intermediate disc against rotation and for mounting it for movement in a closed circular path corresponding to the eccentric mounting of the intermediate disc; an inner gear is rigidly mounted on and coaxial with the intermediate disc and has external teeth; and an outer gear is rigidly mounted on and coaxial with the second drive element, surrounding the inner gear and having internal teeth in greater number than the external ones, for consecutive meshing engagements between the internal and external teeth.

7 Claims, 4 Drawing Figures

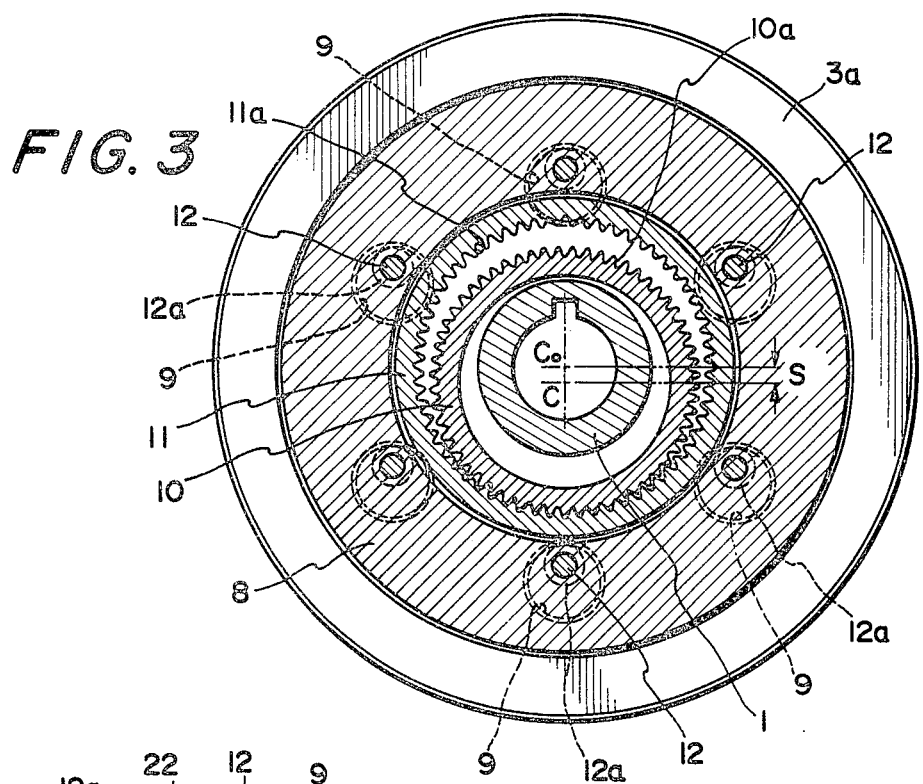
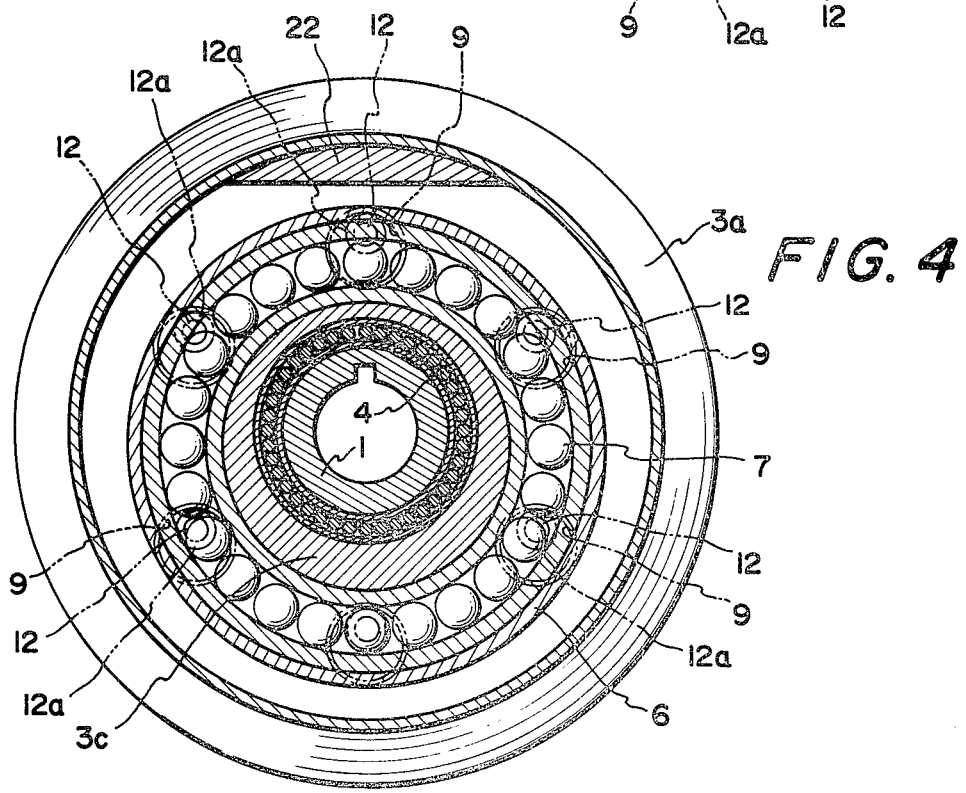

SPEED REDUCTION MECHANISM

BACKGROUND OF THE INVENTION

The present invention relates to speed reduction mechanism and more particularly to a new and improved speed reducucer that uses two gears in its power transmission system.

Speed reducers of various types are known. Generally the known speed reduction mechanisms have complicated gear systems therein that are difficult to construct particularly in the making of the gears, and accordingly are relatively expensive and complex.

SUMMARY OF THE INVENTION

It is a primary object of the invention to provide a speed reduction mechanism of a type in which few gears are used in transmission of power from the input to the output.

Another object is to provide a speed reduction mechanism which is compact and inexpensive to manufacture in view of the limited number of gears therein.

Still another object of the present invention is to provide a speed reduction mechanism which can smoothly transmit power from a driving or input pulley to an output or driven shaft and which operates with extremely low power loss and noise.

A speed reducer according to the invention comprises a driven output boss having a flange or collar mounting an internally toothed gear. Driving means have driving eccentric means eccentric to its center and whose center is displaced from the axis of rotation of the driven output shaft. An intermediate or floating disc is mounted for circular movement on the eccentric means without rotation about the axis of rotation of the speed reducer. The disc has an externally toothed gear having teeth less in number than the other gear is situated within the same. These gears engage with one another during eccentric movement of the disc for imparting thereto rotation in the same direction with that of the circular movement of the disc. The driven shaft is accordingly driven rotationally at a speed substantially less than the speed of rotation of an input pulley.

BRIEF DESCRIPTION OF THE DRAWING

Other features and advantages of the speed reduction mechanism according to the invention will be apparent from the disclosure and appended claims and drawings in which:

FIG. 3 is a section view taken along section line III—III of FIG. 2; and

FIG. 4 is a section view taken along section line IV—IV of FIG. 2.

DESCRIPTION OF THE PREFERRED EMBODIMENT

Figure 1:
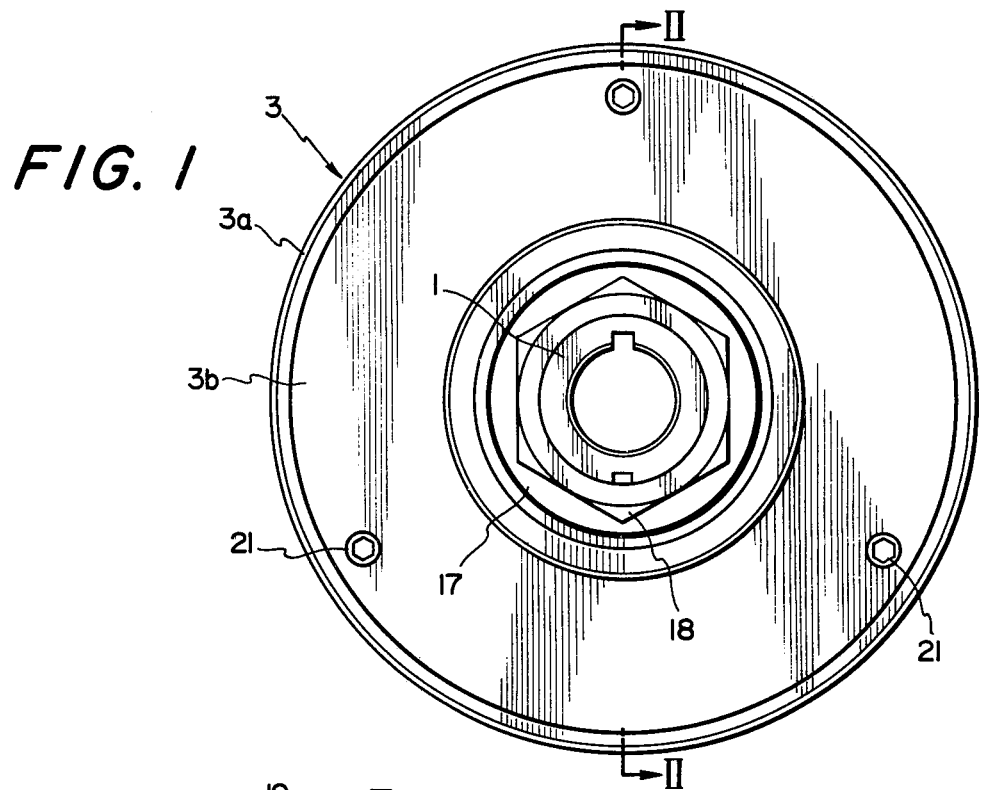
FIG. 1 is a front elevation view of a speed reduction mechanism according to the invention.

The speed reducer or speed reduction mechanism according to the invention illustrated in the drawings comprises a bushing or boss 1 which receives therein a driven output shaft, not shown. The boss 1 has an integral flange portion or collar 2 driven as later described.

The input drive to be reduced in speed is applied through a main or input pulley 3 driven directy or indirectly by a suitable prime mover, not shown. The input drive comprises a pulley rim 3a, a driving disc 3b secured to the pulley rim 3a and an eccentric 3c integral with the driving disc 3b.

The main drive 3 is mounted rotatably on the boss 1 by a needle bearing 4 and a ball bearing 5, these bearings being aligned with one another. The eccentric 3c has a center C which is displaced a distance S from that of the axis of rotation Co of the driven output shaft and of the entire reducer, as shown in FIG. 3. An intermediate or floating disc 6 is mounted by a ball bearing 7 rotatably on the eccentric 3c.

A stationary flange-like disc 8 rotatably supports the boss 1 carrying the output shaft, not shown, and supports the entire mechanism. The stationary disc 8 is provided with a plurality of guides for guiding and restraining the movement of the intermediate disc 6 in conjunction with guide openings 9 thereon as later explained. An inner spur gear 10 with external teeth 10a is mounted on the intermediate disc 6. The gear 10 is concentric with the intermediate disc 6 and, accordingly, with the eccentric 3c, and has teeth the crowns of which are parallel to the axis of rotation Co of the reducer. An outer spur gear 11, surrounding the gear 10 as shown and having internal teeth 11a is mounted on the outer peripheral face of the flange portion or collar 2 of the boss 1. Teeth 11a of the gear 11 extend in the same direction with the axis of rotation of the boss 1 for driving thereof by the inner gear 10.

The number of teeth 11a should be larger than the number of teeth 10a. The gears 10 and 11 are situated such that the teeth 10a are face to face with the surrounding teeth 11a, and in time of "circular" movement of the disc 6, the inner gear 10 thereon will successively engage with arcuate portions of the gear 11.

The stationary disc 8 is provided with a plurality of restraining and guide lugs 12 fitting loosely in corresponding guide holes or guide openings 9 provided on a face of the intermediate disc 6 opposed to these restraining lugs 12. These restraining and guide lugs 12 are each constructed as a roller 12a rotatable on a securing pin 12b. These rollers have play within the openings 9 to allow the aforementioned circular movement of the intermediate disc 6 within a range afforded by the clearance between the individual openings 9 and their corresponding lugs 12a. The stationary disc 8 mounts the restraining and guide lugs 12 and is itself fixed to a frame member 13 rigid on the base of the apparatus, not shown, and mounts a bearing 14 rotatably supporting the boss 1, the driven shaft, not shown, and the entire mechanism.

A plurality of retainer rings 15, 16 retain the bearing 14, and a central washer 17, and nut 18 retain the bearing 5 in position. A square section seal ring 19 is mounted in the face of the stationary disc 8 opposed to the intermediate disc 6. The stationary disc 8 is secured through screw holes 20 to the frame member 13 and the driving disc portion 3b is secured to the pully rim 3a by screws or bolts 21. Balance weight 22 is secured to the pully rim 3a or the driving disc 3b.

The driving input pulley 3 is driven directly or indirectly by means of a prime mover, not shown. Accordingly, the driving eccentric 3c is rotated at the speed and in the direction of the input mover. As the eccentric 3c rotates the intermediate disc member 6 is moved in a motion which can be thought of as "circular" and is restricted from rotation about the axis or rotation Co because of the aforementioned arrangement of the restraining lugs 12 and associated guide holes 9. The disc 6 does not rotate but is permitted to move in a closed orbital path within the range afforded by the clearance of the restraining lugs 12 in the guide holes 9, in the direction of input pulley 3.

The movement of the intermediate disc 6 causes the gear 10 thereon to move such that the external teeth 10a of the gear will successively be brought into operative engagement with the internal teeth 11a of the gear 11 disposed circumferentially thereof. Accordingly, the driven collar 2 and hence the boss 1 and driven output shaft, not shown, are rotatably driven. As indicated heretofore, by suitably selecting the number of teeth in each gear, the driven output shaft can be rotated at the desired speed with respect to that of the driving pulley 3.

The ratio of speed reduction is the quotient obtained by dividing the difference between the number of the teeth of the gears 11 and 10 by the number of teeth of gear 11.

As indicated heretofore, the number of teeth of the driving gear 10, $N_1$ is supposed to be smaller than the number of teeth of the driven gear 11, $N_2$ and, according to the formula $(N_2-N_1)/N_2$ the speed reduction ratio is obtained. In the speed reducer of the drawings, $N_1=59$ and $N_2=60$ and hence the speed reduction ratio is 1/60.

Figure 2:
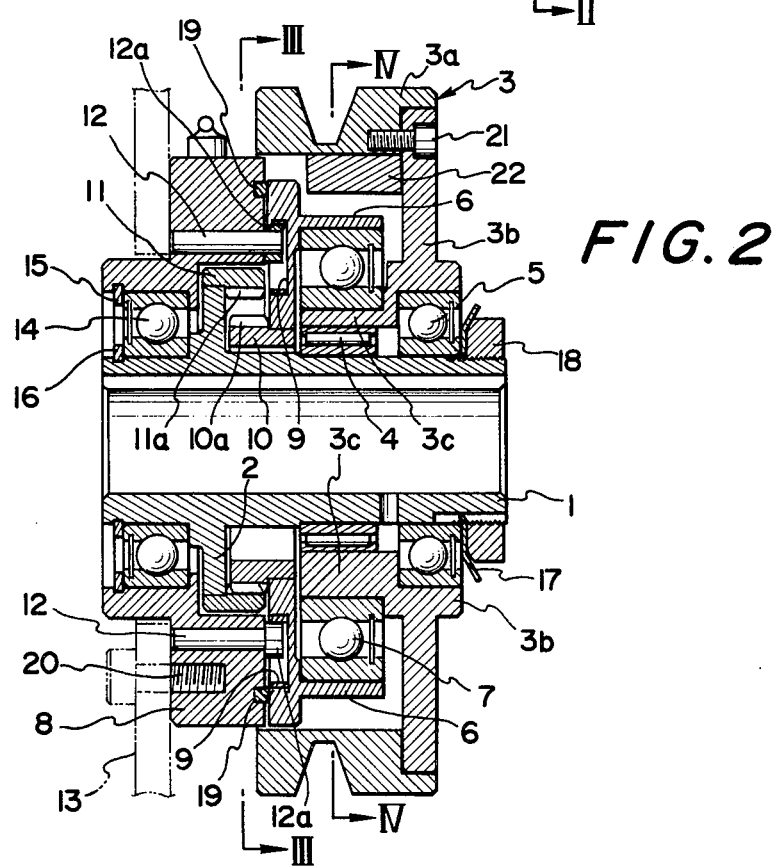
FIG. 2 is a longitudinal section view of the speed reduction mechanism taken along section line II—II of FIG. 1.

A better understanding of the manner in which the gear 10 drives the gear 11 can be had from the illustration in FIGS. 2 and 3. In FIGS. 2 and 3, the gear 10 is at its lowermost position, because the intermediate 6 is at its lowermost position of "circular" motion. The lowermost teeth of the gear 10 are engaging with the gear 11. At the uppermost position of the gear 10, the uppermost teeth of the gear engage with the gear 11. Input rim 3a may be assumed to rotate clockwise, and the resulting "circular" movement of the intermediate disc 6 in the clockwise direction causes the rotation of the gear 11 in the clockwise direction at the reduced speed.

Those skilled in the art will understand that the apparatus can be constructed from suitable materials. The rollers and gears can be made of a suitable steel and the apparatus will still be relatively quiet or silent in operation.

What I claim and desire to secure by Letters Patent:

1. A speed reducer comprising:

a stationary support having a central bore and a flange-like disc surrounding said central bore, a driven element rotatably supported in said central bore of said stationary support and comprising a shaft, an annular flange projecting from said shaft and an annular first gear with internal teeth on said flange, a driving element surrounding said driven element and rotatably supported coaxially with said driven element, said driving element comprising a disc, an annular flange supported by said disc, and an eccentric inwardly of said annular flange, a floating disc having a central spring in which said eccentric is rotatable and carrying a second gear with external teeth disposed inside said first gear, said second gear being smaller than said first gear and having fewer teeth, and means on said stationary support for restraining rotation of said floating disc while permitting its orbital movement by said eccentric, the eccentricity of said eccentric being such as to bring said second gear into mesh with said first gear at one location in its periphery, whereby orbital movement is imparted to said floating disc by rotation of said driving element to bring teeth of said second gear into mesh with teeth of said first gear progressively around the peripheries of said gears to drive said first gear and said driven element at a reduced speed.

2. A speed reducer according to claim 1, in which said driving element is a pulley, said flange providing a belt-receiving circumference of said pulley.

3. A speed reducer according to claim 1, in which said floating disc is disposed in space surrounded by said annular flange of said driving element.

4. A speed reducer according to claim 1, in which said means for restraining rotation of said floating disc comprises pins on said stationary support received loosely in openings in said floating disc.

5. A speed reducer according to claim 1, in which said floating disc is mounted on said eccentric with an anti-friction bearing.

6. A speed reducer according to claim 1, in which said drawing element is rotatably supported by anti-friction bearings on said shaft of said driven element.

7. A speed reducer according to claim 1, in which the overall length of said speed reducer is about twice the axial extent of said driving element including said annular flange.

* * * * *